Figure 1:
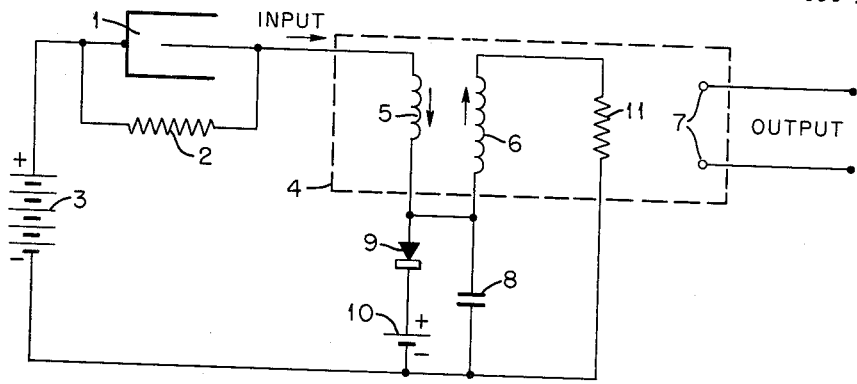

May 22, 1962

G. W. LEES ETAL 3,035,996

TRIPPING CIRCUIT

Filed Dec. 18, 1959

2 Sheets-Sheet 1

INVENTORS.
Gale W. Lees &
BY Edward D. McCormick

ATTORNEY

May 22, 1962     G. W. LEES ETAL     3,035,996
TRIPPING CIRCUIT

Filed Dec. 18, 1959     2 Sheets—Sheet 2

INVENTORS.
Gale W. Lees &
BY   Edward D. McCormick

ATTORNEY

United States Patent Office 3,035,996
Patented May 22, 1962

3,035,996
TRIPPING CIRCUIT
Gale W. Lees, Scotia, and Edward D. McCormick, Baldwinsville, N.Y., assignors to the United States of America as represented by the United States Atomic Energy Commission
Filed Dec. 18, 1959, Ser. No. 860,617
9 Claims. (Cl. 204—193)

This invention relates to tripping circuits and more particularly to a floating level trip arrangement for actuating the safety system of a nuclear reactor which is responsive to short reactor period, neutron flux level or instrumentation failure.

In the prior art of nuclear reactor controls it has been the practice to employ a series of separate vacuum tube amplifiers in the safety control circuits which will respond to fast pile period and to flux level to release or to insert the control rods to "scram" the reactor and close it down when the pile period becomes unusually short or when the neutron flux exceeds a safe level. Provision was not usually made for actuating the safety system or signalling the operator upon failure of instrumentation, as it was usually detected by periodic monitoring. The control circuits customarily employed vacuum tube amplifiers which were subject to failure and drift resulting from shock, breakage, aging, warping and normal consumption of the elements under the influence of temperature and other changes. Specifically, the devices of the prior art which produced period or rate trip in the power range of nuclear reactor operation required an amplifier with a logarithmic characteristic, which was customarily obtained by the use of a vacuum tube. Then to provide for high flux trip and trips due to an open cable or power supply failure for the ion chamber, additional components and a multiplicity of circuits were necessary.

Applicants with a knowledge of these problems in the prior art have for an object of their invention the provision of a simplified single-trip circuit that performs the composite functions of a trip for instrument failure, excessive flux level, and short reactor periods for actuating the safety system of neutron reactor.

Applicants have as another object of their invention the provision of a trip circuit which employs a magnetic amplifier to reduce deterioration by eliminating moving parts and overcoming failures resulting from shock and the deteriorating qualities of the vacuum tube.

Applicants have as another object of their invention the provision of a trip circuit which obviates the need for multiple control circuits, vacuum tubes, and circuits with logarithmic characteristics for actuating a nuclear reactor safety system, and which is set to activate the safety system when the current flow through the circuit is either zero or positive.

Applicants have as a further object of their invention the provision of a trip circuit for a neutron reactor safety system which will function at low levels of neutron flux without false operation.

Applicants have as a still further object of their invention the provision of a trip control for a nuclear reactor control system which is simple in construction, reliable in operation, substantially free from maintenance problems, and uniform in characteristics.

Other objects and advantages of our invention will appear from the following specification and accompanying drawings, and the novel features thereof will be particularly pointed out in the annexed claims.

Figure 2:
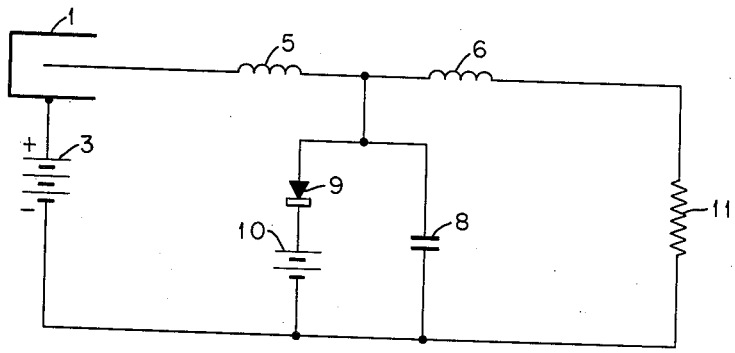
Figure 3:
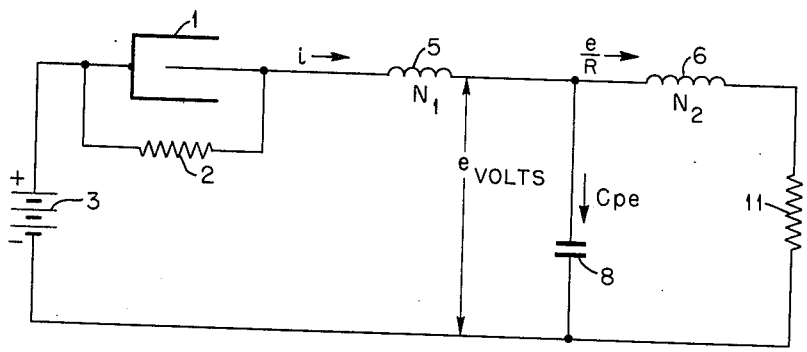
Figure 4:
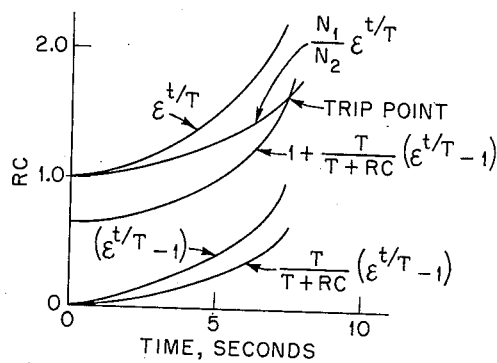
Figure 5:
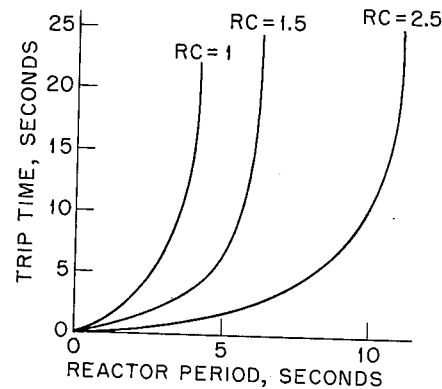
Figure 6:
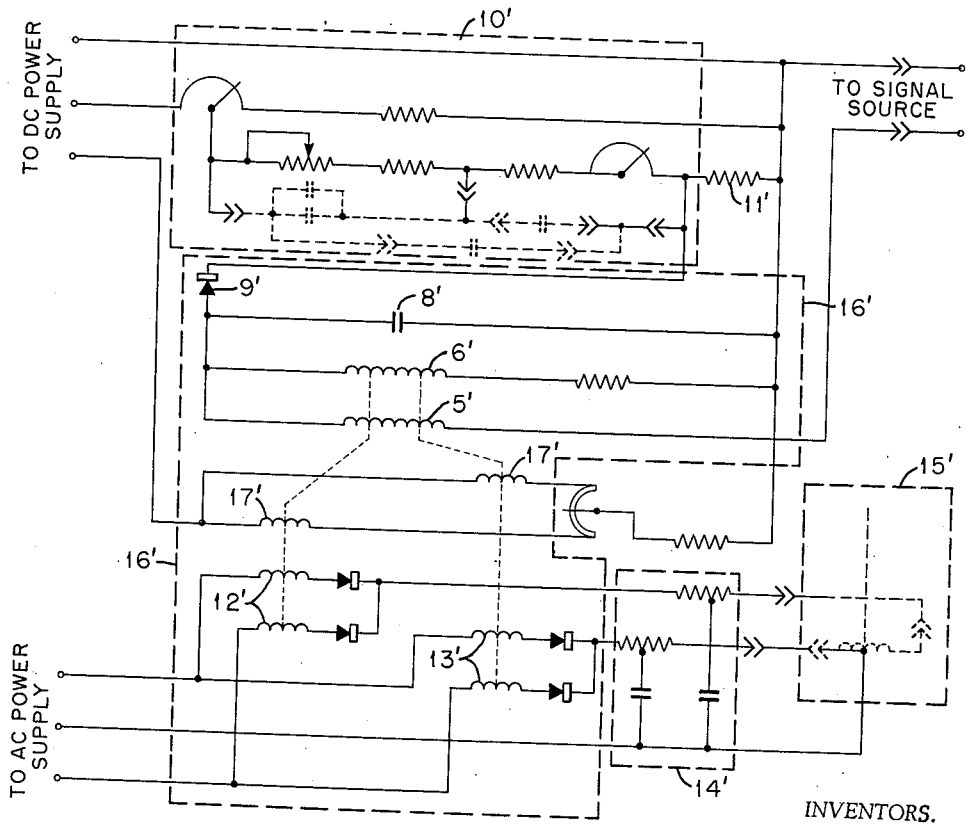

In the drawings, FIG. 1 is a schematic of our improved trip circuit. FIG. 2 is a simplified circuit diagram of the equivalent trip circuit. FIG. 3 is a simplified diagram of the same trip circuit with the biased rectifier omitted. FIG. 4 is a graph (not to scale) of RC product plotted against time which generally indicates the point of trip. FIG. 5 is a graph of "time to trip" plotted against Reactor Period which indicates the general characteristics of applicants' improved trip circuit. FIG. 6 is a schematic of applicants' system including the secondary windings of the magnetic amplifier and the conventional secondary circuits which provide the output indicated in FIG. 1 together with the load.

Referring to the drawings in detail, 1 designates a conventional ion chamber type of neutron detector which has a D.C. output in microamperes proportional to the neutron flux in a neutron reactor. The ion chamber 1 may be shunted with a large optional resistor 2 for a purpose indicated hereinafter. Chamber 1 is connected in series with a high voltage D.C. source such as battery 3. Ion chamber 1 is coupled into a push-pull magnetic amplifier 4. The magnetic amplifier may take various forms and can be connected in a variety of different ways. See Magnetic Amplifier Circuits, second edition, by Geyger, published by McGraw-Hill Book Company, New York, N.Y., pages 27, 29, 41, 48, 111, 133, etc., and the patents to Collins, 2,807,006 and Ringleman, 2,862,112, and it has the desirable characteristics of being rugged and capable of operation for long periods without failure. In the present arrangement it has primary windings designated "signal" winding 5 and "reference" winding 6. The secondary windings being connected in the conventional way, have, for convenience, been omitted from FIGS. 1 and 2.

The effect of the "signal" winding 5 is to produce positive amplifier output at terminals 7, and the effect of the "reference" winding 6 is to cause negative amplifier output. The signal from the ion chamber 1, which has a D.C. output in microamperes proportional to the neutron flux in a neutron reactor, is applied to the control windings 5, 6. All the ion chamber current passes through the "signal" winding 5, but the "reference" winding 6 is shunted by a capacitor 8 and a voltage limiting device which preferably takes the form of a zener diode or rectifier 9 biased by E.M.F. source 10. In addition, one or more resistors 11 are connected in series with the "reference" winding 6 to insure a relatively constant and definite resistance in the "reference" winding. It is necessary that the "reference" winding 6 have a greater number of turns than the "signal" winding 5. The input current normally causes the amplifier to deliver a negative output, i.e., ignoring the effects of the shunting capacitor and voltage limiting circuit.

The effect of the capacitor 8 is to bypass sudden increases of the input current around the "reference" winding 6. When the "reference" winding consists of 25 percent more turns than the "signal" winding, a step increase of input current of more than 25 percent causes the "signal" winding ampere-turns to exceed the "reference" winding ampere-turns, thus causing a trip. The exact magnitude of short periods which causes a trip can be adjusted by varying the capacitor or the "reference" winding resistor.

When the input current has increased to such a magnitude that the voltage drop across the "reference" winding and the resistor is equal to the value of the voltage limiter, no additional current can flow in the "reference" winding 6 and a subsequent increase of sufficient magnitude of input current in the "signal" winding 5 will cause a "trip."

In the equivalent circuit of FIG. 2 it is assumed that current flow is to the right as indicated by the arrow. The device is considered "tripped" when the output is positive or zero and not tripped when the output is negative. If instrumentation, such as the chamber 1, fails, no current flows and the output drops to zero causing the circuit to assume the trip condition. When acting as a level trip, the capacitor 8 may be ignored. As the current increases up to a critical point the current flow through the "signal" and "reference" windings 5, 6 are the same, but since the "reference" winding 6 has more turns, the output signal is negative and no trip results. When the current has risen to the critical point, the voltage drop across resistor 11 reaches the back bias voltage on the diode 9 and a further increase in current from chamber 1 produces little or no increase of current flow through the "reference" winding 6 since the increase in current will flow through the diode circuit 9, 10. As a result, current flow will increase through the "signal" winding 5 and net voltage output will change to plus, causing the circuit to trip.

The effect of changing reactor period on this trip circuit can best be illustrated by referring to the simplified circuit of FIG. 3. If there is a rapid increase in current flow as the result of a fast change in flux, and in turn, a quick change in ionization in chamber 1, all of the increased current flow passes through the signal winding 5, and most of such increased current flows through the capacitor 8, and will be shunted around "reference" winding 6, so that current flow through "reference" winding 6 will not increase proportionately, creating a zero or positive output which will have the effect of tripping the circuit.

The response of the trip circuit to this gradual rate of increase, such as a nuclear reactor experience, is best understood from the analysis that follows:

The signal, $i$, from a nuclear detector (ion-chamber) 1 may be expressed:

(1) $$i = I_0 \epsilon^{t/T}$$

where $I_0$ is the signal at time zero,
$\epsilon$ = Napierian base,
$T$ is the "period" of the reactor in seconds, and
$t$ is the time in seconds since $i$ was equal to $I_0$.

In FIG. 3, $N_1$ represents the number of "signal" winding turns, $N_2$ the number of "reference" winding turns, $R$ represents the resistance of the "reference" winding and a series resistor, and $C$ the capacitor which adjusts the rate-of-increase trip point. The biased rectifier used to obtain a trip from excessive power level is omitted for clarity. The inductances of $N_1$ and $N_2$ are neglected. The current through $N_1$ is $i$. The current through $N_2$, by Ohm's law, is $e/R$, where $e$ is the voltage across capacitor $C$. Since there are more turns on the "reference" than the signal winding, $N_2 > N_1$, during steady state $N_1 i$ is $< N_2 e/R$. When (2) $$N_1 i = N_2 e/R$$

a trip occurs. The current, $i$, during a change divides between C and R thus:

$$i = e/R + C \frac{de}{dt}$$

or using $$p = \frac{d}{dt}$$

and repeating Equation 1

(3) $$i = e/R + Cpe = I_0 \epsilon^{t/T}$$

The solution for Equation 3 results in:

(4) $$i = \left[ I_0 + I_0 \left( \frac{T}{T+RC} \right) (\epsilon^{t/T} - 1) \right] + \left[ I_0 \left( \frac{RC}{T+RC} \right) (\epsilon^{t/T} - 1) \right] = I_0 \epsilon^{t/T}$$

The first brackets of Equation 4 represents $e/R$ and the second represents $Cpe$. From Equations 2 and 4, trip occurs when:

$$N_1 I_0 \epsilon^{t/T} = N_2 \left[ I_0 + I_0 \left( \frac{T}{T+RC} \right) (\epsilon^{t/T}) - 1) \right]$$

or when (5) $$\frac{N_1}{N_2} \epsilon^{t/T} = 1 + \left( \frac{T}{T+RC} \right) (\epsilon^{t/T} - 1)$$

The time to trip for any period (T) and value of RC product may be determined graphically by plotting the values of the terms on each side of Equation 5, see FIG. 4. Or it may be determined by a digital computer.

To determine the shortest period that will not trip a given circuit, set $t = \infty$ and Equation 5 reduces to:

$$\frac{N_1}{N_2} \epsilon^{\infty} = 1 + \frac{T}{T+RC} (\epsilon^{\infty} - 1); \frac{N_1}{N_2} \epsilon^{\infty} = \frac{T}{T+RC} \epsilon^{\infty}; \frac{N_1}{N_7} = \frac{T}{T+RC}$$

$$N_2 T = N_1 T + N_1 RC; (N_2 - N_1) T = N_1 RC$$

(6) $$T = \left( \frac{N_1}{N_2 - N_1} \right) RC$$

Curves such as FIG. 5 may be plotted to describe the performance of the rate increase detection circuit. However, it is more common to obtain these curves from an analog computer which simulates the devices and also the actual behavior of a nuclear reactor. The analog computer can determine the time to trip when the period is not constant but may be varying according to some complex function.

The system is prevented from tripping at start-up by a resistor 2 connected permanently across the ion chamber. The current carried by this resistor is set as small as will consistently keep the device in an untripped condition. The resistor is located at the ion chamber so that any break in the ion chamber cable will cause a trip. The effect during operation is negligible except at very low levels.

Now referring to the circuit of FIG. 6, it shows applicants' improved trip circuit with the conventional connections from the secondary windings to the other components. In this arrangement, 5' represents the signal winding, 6' the reference winding, 8' the capacitor, 9' the diode, 11' the resistor, and 17' the bias windings for adjusting amplifier output balance. The circuit 10' serves as a high flux trip level with programmed changes in settings effected by appropriate switches and potentiometers. One set of secondary windings are indicated at 12' and the other set are indicated at 13'. Both sets of secondary windings are coupled to both primary windings. Both sets feed through filter 14' to load 15'.

Having thus described our invention, we claim:

1. A trip circuit for a nuclear reactor safety system comprising a source of signals, a push-pull magnetic amplifier having dual primaries connected to produce magnetic flux in opposition to each other and set to produce a trip upon positive or zero signal, one of said primaries inducing potentials of greater magnitude in the secondaries of said amplifier than the other of said primaries, said primaries being connected in series and coupled to receive signals from said source, and a shunt circuit bridged across said one of said primaries and rseponsive to signal above a predetermined magnitude for by-passing current therearound to overcome the predominance of said one of said primaries and produce a positive or zero trip signal.

2. A trip circuit for a nuclear reactor safety system comprising a source of signal currents, a push-pull magnetic amplifier having dual primaries connected in opposition to each other and set to trip on positive or zero signals, said primaries being series connected and coupled to said source, one of said primaries inducing greater potentials in the secondaries of the amplifier than the other of said primaries, a shunt circuit bridged across said one of said primaries and responsive to the rate of change of magnitude of signals from said source above a predetermined value for bypassing a portion thereof around said one of said primaries to permit the other of said primaries to predominate and produce a positive or zero trip signal.

3. A trip circuit for a nuclear reactor safety system comprising a source of signal currents, a push-pull magnetic amplifier having dual primaries connected in phase opposition and set to trip on positive or zero signals, said primaries being series connected and coupled to said source, one of said primaries inducing greater potentials in the secondaries of the amplifier than the other of said primaries for normally controlling the operation of the system, and shunt circuits coupled across said one of said primaries and responsive to signal magnitude and rate of change of signal from said source above predetermined values to bypass a portion of the signals around said one of said primaries to permit the other of said primaries to predominate and produce a positive or zero trip signal.

4. A trip circuit for a nuclear reactor safety system comprising a source of signal currents, a push-pull magnetic amplifier having dual primaries and set to trip on positive or zero signals, said primaries being connected and coupled to said source, one of said primaries normally inducing greater potentials in the secondaries of the amplifier than the other of said primaries, and a pair of circuits shunted across said one of said primaries for producing positive or negative signals, one of said pairs of circuits being responsive to signals from said source above a predetermined magnitude and the other of said pairs being responsive to the rate of change of signals from said source above a predetermined rate to bypass a portion of the signals around the first of said primaries.

5. A trip circuit for a nuclear reactor safety system comprising a source of signal currents, a push-pull magnetic amplifier having dual primary windings connected in phase opposition and set to trip upon positive and zero signals, said windings being connected in series and coupled to said signal source, one of said windings having more turns than the other to normally predominate and produce a negative signal, and a shunt circuit including a biased diode bridged across said one of said windings and responsive to signals above a predetermined level for bypassing a portion of the signal currents therearound to overcome the predominance of said one of said windings and produce positive and zero trip signals.

6. A trip circuit for a nuclear reactor safety system comprising a source of signal currents, a push-pull magnetic amplifier having dual primary windings connected in phase opposition and set to trip upon positive and zero signals, said windings being connected in series and coupled to said signal source, one of said windings having more turns than the other to normally produce a negative signal and control the operation of the system, and a shunt circuit including a capacitor bridged across said one of said windings and responsive to rate of change of signal amplitude to bypass a portion of the signals therearound to produce positive or zero trip signals.

7. A trip circuit for a nuclear reactor safety system comprising a source of signal currents, a push-pull magnetic amplifier having dual primary windings and set to trip upon positive and zero signals, said windings being connected in series and coupled to said signal source, one of said windings having more turns than the other to normally predominate and produce a negative signal, and a shunt circuit bridged across said one of said windings including parallel paths, one of said paths having a biased diode for passage of signals above a predetermined level and the other of said paths having a capacitor for passing increased current with increased rate of change of signal to bypass portions of the signals around the said one of said windings to produce positive or negative trip signals.

8. A trip circuit for a nuclear reactor safety system comprising a source of signal currents responsive to nuclear radiations, a push-pull magnetic amplifier having dual primary windings connected in phase opposition and responsive to reset positive or zero trip signals, said dual windings being series connected and coupled to the signal source, one of said windings having more turns than the other to normally exercise a predominating influence and control the operation of the system, said windings being connected to normally provide a negative signal, and a shunt circuit bridged across said one of said windings and responsive to signals above a predetermined magnitude to bypass a portion of the signals around said one of said windings to permit the other of said windings to predominate and produce positive or zero trip signals.

9. A trip circuit for a nuclear reactor safety system comprising a source of signal currents responsive to nuclear radiations, a push-pull magnetic amplifier having dual primary windings connected in phase opposition and responsive to reset positive or zero trip signals, said dual windings being series connected and coupled to the signal source, one of said windings having more turns than the other to normally exercise a predominating influence and control the operation of the system, said windings being connected to normally provide a negative signal, a high resistance bypass path shunted across said source for normally providing a steady current to said winding to maintain the state of the trip circuit, and a shunt circuit bridged across said one of said windings and responsive to signals above a predetermined magnitude to bypass a portion of the signals around said one of said windings to permit the other of said windings to predominate and produce positive or zero trip signals.

References Cited in the file of this patent

UNITED STATES PATENTS

| | | |
|---|---|---|
| 2,790,948 | Wennerberg | Apr. 30, 1957 |
| 2,856,545 | Adams et al. | Oct. 14, 1958 |
| 2,926,300 | Mamon | Feb. 23, 1960 |